Patented Feb. 6, 1945

2,369,036

UNITED STATES PATENT OFFICE 2,369,036

TREATING FATTY BODIES

J. D. Fitzpatrick and Latimer D. Myers, Cincinnati, Ohio, assignors to Emery Industries, Inc., Cincinnati, Ohio, a corporation of Ohio No Drawing. Application June 5, 1941, Serial No. 396,752

9 Claims. (Cl. 260—406)

This invention relates to a process of treating fats and fatty bodies for the production of fatty acids. More specifically, the object has been to provide a method for obtaining fatty acids which are industrially useful for special or technical purposes.

The fats naturally occurring in nature consist of the esters of glycerine and fatty acids. The fatty acids vary in the length of carbon chain from the $C_8$ acids contained in cocoanut oil to the $C_{24}$ acids contained in certain fish oils. These acids also vary in their degree of unsaturation from the completely saturated $C_{16}$ and $C_{18}$ acids to the highly unsaturated linkages.

Individual naturally occurring fats contain these various acids in varying proportions, for example olive oil contains a relatively large amount of unsaturated oleic acid and a relatively small amount of saturated acids such as stearic and palmitic acids. The animal fats such as tallow contain relatively large amounts, from 40 to 50%, of saturated fatty acids and from 50 to 60% of oleic acid.

It is the exception rather than the rule that any one naturally occurring fat will consist of the glyceride of only one fatty acid. It also appears to be a rule of nature that fatty acids which enter into the triglyceride molecules do so with the maximum degree of heterogeneity, that is instead of a fat consisting for example of a mixture of trioleic glyceride, tristearic glyceride and tripalmitic glyceride, it contains mixed glycerides such as oleic stearic palmitic glyceride.

In special products, for certain uses, as in edible products, such mixed glycerides possess no serious disadvantages but for other uses in the chemical industry the pure acids or the pure triglycerides are much more suitable. The reason for this is the very considerable difference in the properties of the various fatty acids or their derivatives depending upon chain length, degree of unsaturation, and configuration. For example, the alkali metal soaps of stearic or palmitic acids are more insoluble in water and produce gels at low concentrations but are more stable than the corresponding soaps of oleic acid which are relatively water soluble. The glycerides of highly unsaturated fatty acids exhibit the property of drying when exposed to the air, forming tough films. The glycerides of the saturated fatty acids or of the less highly unsaturated acids do not possess this property and their presence in an oil to be used in the manufacture for example of paints, varnishes, coating compositions and certain resinous plastics is a serious detriment.

Otherwise expressed, the fatty acids are more valuable commercially when separated than when mixed together. This fact is the basis of the fatty acid industry, one of whose principal objects is to separate the fatty acids which occur admixed in natural fats.

The processing steps which have heretofore been available to the fatty acids industry to accomplish this purpose have included the following:

1. *Preliminary purification.*—This includes acid boiling, alkali refining, filtering, centrifuging, etc., the purpose of which is to remove non fatty impurities.

2. *Splitting or saponification.*—This involves decomposition of the fatty acid glycerides into free fatty acids and glycerine, and may be accomplished by means of the Twitchell reagent or by autoclaves.

3. *Purification.*—Usually accomplished by distillation although filtration with bleaching earths may occasionally be used.

4. *Separation.*—The methods of separation may be sub-divided into:

A. Methods which effect a separation of the normally solid from the normally liquid fatty acids, for example the pressing method commonly employed in the animal fatty acid industry.

B. Methods which effect a separation of the short chain length low boiling acids from the long chain length high boiling acids as, for example, by fractional distillation.

C. Method effecting a separation of fatty acids on the basis of their relative solubility in various solvents. In this case both chain length and degree of unsaturation play a part.

As a generalization it may be said that the difference in properties between the unsaturated fatty acids and the saturated fatty acids is greater than the difference between the various saturated fatty acids themselves. Methods which effect this sort of a separation are the most widely used as they have the greatest economic advantage.

Upon consideration of the processing steps given above it will be noted that with the exception of the splitting operation, they are all physical rather than chemical methods; that is they depend for their successful operation upon differences in the physical properties of the various fatty acids.

It is one purpose of this invention to provide a method for segregating saturated fatty acids by chemical modification of the unsaturated acids.

This method may be employed either to supplement or to supplant present conventional processing steps.

It is also the purpose of this invention to provide a means of obtaining useful fatty acids other than those obtained by normal processing operations and hitherto unavailable in commercial quantities.

In our copending application Serial No. 385,740, filed March 28, 1941, we have described a method whereby unsaturated fatty acids may be broken down into acids of lower molecular weight with good yields by means of an oxidizing treatment employing chromic acid as the oxidizing agent. We have now determined that such an oxidizing treatment may advantageously be employed as a step in regular fatty acid manufacture in order to facilitate the production of saturated fatty acids free from oleic or other unsaturated acids. Otherwise expressed, we have discovered a method of sequestering the unsaturated components of a natural oil or fat by converting them chemically into other products rather than to merely separate them by depending entirely upon physical means or upon the physical properties of the fatty acids themselves.

The invention, briefly, is the method wherein the unsaturated components of fatty acids or fatty glycerides, as the case may be, are converted into saturated components of lower molecular weight in order to produce materials of improved special utility, or in order that the lower molecular weight saturated components produced by the oxidation may be removed from the unconverted saturated components more easily than by the methods which have been available in the past. In accordance with the invention, the lower molecular weight compounds may be removed by water extraction, by distillation, or by a technique employing both procedures, and individual low molecular weight components also may be separated from one another, if desirable, by similar treatment.

The use of oxidation as the preferred chemical treatment is particularly advantageous in that the oxidation products are readily separated from the saturated unreacted material. The ease of separation results from the fact that an oxidizing treatment yields products having much lower molecular weight than the initial materials. The lower molecular weight materials have either lower boiling points, sufficiently great water solubility, or solubility in very mild alkaline solution, that their removal can be accomplished easily and completely.

To illustrate the use of oxidation as a means of isolating saturated acids, it is helpful to consider the oxidative cleavage products of oleic acid. A controlled oxidation of oleic acid such as results from the use of chromic acid, yields, roughly, equal parts of a nine carbon atom monobasic saturated acid, a nine carbon atom dibasic saturated acid and 14 to 16 carbon atom monobasic saturated acids.

The nine carbon atom monobasic acid is much more volatile than the $C_{16}$ and $C_{18}$ acids and can be separated from these acids by simple distillation without necessarily resorting to a fractionating column. The distilling range being almost 100 degrees lower than normal animal fatty acids, they can be distilled if desired without the use of open steam and at temperatures readily obtainable by steam heating without employing excessively high steam pressures.

The dibasic acids are soluble in hot water and relatively insoluble in cold water and can be separated from the unchanged saturated acids by simple hot water washing followed by cooling and crystallization of the water solution. Some of the higher dibasic acids such as those which may be obtained from rape seed oil or partially hydrogenated fish oil or the like are less water soluble and consequently may not readily be removed by water washings. However, higher dibasic acids of this type readily may be extracted with mild alkaline solutions, for example, a weak solution of sodium bicarbonate. The bicarbonate acts to saponify one of the carboxyl groups of the dibasic acid so as to render it water soluble but it does not saponify any monobasic acids which may be present.

The monobasic saturated acids which are formed as a result of a side reaction, possibly as a result of double bond shifting and beta oxidation, are low in iodine value and, being essentially saturated fatty acids, are simply allowed to remain with the saturated acids originally present in the natural fat.

Thus, by chemically modifying the unsaturated acids, we have been able to obtain saturated acids free from unsaturants and have avoided the difficulties ordinarily encountered in separating solid and liquid acids which differ only slightly in molecular weight, have practically the same boiling points, and show mutual solubility one in the other.

Oxidation as a step in separating fatty acids may be introduced at various points in the manufacturing processes ordinarily carried out in producing fatty acids, either to augment the ordinary separating step or to replace entirely the conventional methods of separation. The choice of the most suitable point for the application of oxidation will be governed by the nature of the materials being processed, the cost of the other processing methods, and the uses to which the resulting products may be put. In general, the oxidizing step is carried out after the preliminary purification step, such as the acid boil and prior to distillation, if distillation is used as a purification step. This procedure avoids excessive use of oxidizing agent in decomposing organic impurities and gains the advantage of improved color of products resulting from distillation. Oxidation may be carried out prior to splitting if the glycerine and dibasic acids produced both find application in the same field, for example, in resins. In this case a separate water extraction for the removal of dibasic acids is avoided. Oxidation may be carried out after splitting if it is desirable to obtain the glycerine and dibasic acids as separate products.

In certain cases oxidation alone provides sufficient modification in properties to permit usage in certain fields without further purification or separation.

The adaptability of the method of the present invention is best illustrated by the following examples:

*Example 1*

Production of saturated fatty acids from a natural fat containing principally stearic, palmitic and oleic acids, for example, tallow. 100 parts of tallow are treated if necessary with 1 to 2% 60° sulfuric acid in order to remove impurities. The purified tallow is then treated repeatedly with chromic acid oxidizing solution until the iodine value of the oxidized product has been reduced to the desired point—ordinarily to an iodine value of three. The oxidized tallow is then split either by the Twitchell method or preferably by high pressure methods in order to avoid neutralization of sulfuric acid. The split fatty acids are washed several times with hot water to remove the last traces of dibasic acids and the water solutions evaporated, yielding a solid product consisting of a mixture or solution of dibasic acids and glycerine in each other. The remaining low iodine value saturated acids may be used as such or if it is desired to improve their color they may be distilled. If a separation of the low molecular weight acids from the high molecular weight acids is desired, the low molecular weight acids may be removed separately by a topping operation or by fractional condensation. The resulting products consist of 9 carbon chain length acids and a mixture of predominantly 16-18 chain length acids containing a somewhat greater proportion of 16 carbon and 12 and 14 carbon atom acids than were present in the original tallow. These fatty acids may be used in place of commercial stearic acid obtained by conventional methods.

*Example 2.—Processing of cocoanut oil*

Cocoanut oil is split by conventional methods and the mixed cocoanut oil fatty acids treated with successive amounts of chromic acid oxidizing mixture until a sufficiently low iodine value is reached say from 2 to 3. The resulting mixture of acids is treated with 1-2% of strong sulfuric acid to remove traces of chromium. The resulting acids of low iodine value and of low average molecular weight may be employed as modifying acids for non drying alkyd resins. The low iodine value insures color stability and the low average molecular weight results in improved compatibility.

*Example 3—Processing of palm oil*

Palm oil contains from 40 to 50% of unsaturated acids whose separation from the saturated acids is difficult by pressing methods. Palm oil may be split and the unsaturated acids oxidized by treatment with chromic acid. The oxidization products are separated by first distilling off the low molecular weight saturated acids, then the high molecular weight solid acids and finally the dibasic acids. The latter two types of acids may be completely separated by removing the dibasic acid by washing the distillate repeatedly with hot water.

The above examples are representative of methods of carrying out our proposed process. It will be evident to those skilled in the art that considerable variation in procedure is possible without departing from the principle of our invention. The process we propose is advantageous not only from a manufacturing standpoint, but also from the point of view of agricultural economy as products not hitherto available may be economically produced from natural fats.

For the purpose of assisting those skilled in the art in the practice of the present invention, the oxidizing agent disclosed in the aforesaid copending patent application is given as a preferred oxidizing reagent; it is comprised of approximately one part of chromic acid, two and one-half parts of concentrated sulphuric acid, and four parts of water, and, in the use of this reagent, a sufficient quantity preferably is employed so that at least four oxygen atoms are supplied by the chromic acid for each double bond in the unsaturated components of the acid being treated. The sulphuric acid is present in amount sufficient to convert the chromic acid to chromium sulphate as its oxygen is liberated, and the water serves to keep the chromic acid and sulphuric acid in solution with one another so as to facilitate the mixture of the reagent with the fatty body being treated. But, while this reagent is preferred, those skilled in the art will understand that other suitable oxidizing agents may be employed to effect the desired oxidation and conversion of the unsaturated components into saturated compounds of lower molecular weight.

The oxidizing treatment may be applied either before splitting of a triglyceride or afterward, depending upon the availability of material or upon the products desired. If a triglyceride is oxidized and the oxidation product is not thereafter split the material obtained is a mixture of low molecular weight monobasic acids and glycerides of dibasic acids and higher molecular weight saturated fatty acids. The low molecular monobasic acids may be recovered by distillation, leaving the mixed glycerides. This technique is useful where mixed oxidation products are desirable and it may be employed to advantage, for example, upon cocoanut oil, olive oil and fats containing relatively high olein content.

If the glycerides recovered from this treatment are now split, further products may be isolated. These include dibasic acids, high molecular weight saturated acids and glycerin, or high molecular weight acids and a mixture of dibasic acids and glycerin. If dibasic acids are sought it is desirable to split before oxidation rather than afterward because there is some difficulty in removing the last traces of dibasic acid by crystallizing water solutions of them. If fats are split before oxidation so that fatty acids may be oxidized, a wide variety of products may be isolated. For instance, dibasic acids may be separated from high and low molecular weight saturated acids by water washing. On the other hand, low molecular weight monobasic acids may be separated from a mixture of dibasic acids and high molecular weight acids by partial distillation of the low molecular weight acids.

The segregation of low molecular weight, high molecular weight and dibasic acids may be accomplished in various ways. The preferred method is to distill off the low molecular weight acids and extract the dibasic acids by means of water, leaving the high molecular weight acids. These may be distilled if desirable. As a second example, an oxidation product containing low molecular weight acids, dibasic acids and high molecular weight acids may be treated first with water for extraction of the dibasic acids, and a distillation step may be employed as the second step. In still another example the low molecular weight acids may be distilled from a mixture containing low molecular weight acids, dibasic acids and high molecular weight acids, then the high molecular weight acids and dibasic acids may be distilled and, last, the dibasic acids may be removed from the second distillate by extraction of them with water.

All of these methods may be carried out by using a mild alkaline solution instead of water in those instances where the dibasic acids produced are of chain length greater than nine carbon atoms.

Having described our invention, we desire to be limited as to the scope thereof only by the claims which follow:

1. A method of separating saturated and unsaturated components of mixed fatty acids having saturated and unsaturated fatty acid components, which method comprises the steps of disruptively oxidizing the unsaturated acids into saturated acids of lower molecular weight and dibasic acids through scission at the double bonds of the unsaturated acids, by treating the said mixture with a chromic acid oxidizing reagent, and then separating the products of oxidation from the unchanged acids.

2. A method of isolating saturated higher fatty acids from a mixture of animal fatty glycerides which contains both saturated and unsaturated higher fatty glycerides, said method comprising disruptively oxidizing the unsaturated higher glycerides into saturated glycerides of lower molecular weight and monobasic acids, through scission of the higher unsaturated glyceride molecules at the double bonds thereof, by treating the mixture with a chromic acid oxidizing reagent, hydrolyzing the glycerides into higher and lower molecular weight acids and glycerine, and separating the acids one from another.

3. The method of separating saturated and unsaturated acids of mixed fatty acids in which unsaturated fatty acids are contained, which method comprises disruptively oxidizing the unsaturated acids into saturated acids of lower molecular weight and dibasic acids, to cause scission at the double bonds of the unsaturated acids of the mixture, by treating the said mixture with a chromic acid oxidizing reagent, then treating the selectively oxidized mixture with an aqueous solution which is sufficiently alkaline to saponify one of the carboxyl groups of each dibasic acid molecule to render it water soluble but insufficiently alkaline to saponify monobasic acids present in the mixture, and subsequently removing the partially saponified dibasic acids from the mixture by water extraction.

4. The method of isolating stearic and palmitic acids from a mixture of oleic, stearic and palmitic acids, which method comprises selectively disruptively oxidizing the oleic acid into saturated acids of lower molecular weight and dibasic acids through scission of the oleic acid molecules at the double bonds thereof, by treating the said mixture with a chromic acid oxidizing reagent, then separating the products of oxidation from the stearic and palmitic acids.

5. The method of isolating saturated fatty acids from a fatty acid mixture containing both saturated and unsaturated fatty acids, which method comprises disruptively oxidizing the unsaturated fatty acids of the mixture into saturated acids of lower molecular weight and dibasic acids through scission at the double bonds thereof, by treating the said mixture with a chromic acid oxidizing reagent, and then separating the products of oxidation from the unchanged saturated acids present in the original mixture.

6. A method of isolating saturated fatty acids from mixed fatty acids which contain both saturated and unsaturated fatty acids, which method comprises disruptively oxidizing the unsaturated acids of the mixture into lower molecular weight mono and dibasic saturated acids, by treating the said mixture with a chromic acid oxidizing reagent, removing the lower molecular weight monobasic acids from the oxidized mixture by distilling them from the unconverted saturated fatty acids and removing the dibasic acids by extraction with water.

7. A method of isolating saturated fatty acids from a fatty acid mixture containing both saturated and unsaturated fatty acids, which comprises disruptively oxidizing the unsaturated acids of the mixture into lower molecular weight mono and dibasic saturated acids, by treating the said mixture with a chromic acid oxidizing reagent, removing the lower molecular weight monobasic acids from the oxidized mixture by distilling them from the unconverted saturated fatty acids and removing the dibasic fatty acids by extracting them with a mildly alkaline aqueous solution.

8. The method of separating the saturated and unsaturated components of a fatty glyceride mixture which contains saturated and unsaturated components, said method comprising the step of hydrolyzing the glycerides and the step of oxidizing unsaturated components, by treating the said mixture with a chromic acid oxidizing reagent, the said hydrolysis being conducted to effect the splitting of glycerides into acids and glycerine, and the step of oxidizing being conducted to cleave disruptively the unsaturated components at the double bonds of the molecules thereof into saturated components of lower molecular weight, and separating the products of said reactions.

9. A method of separating saturated and unsaturated components of a fatty material of the group consisting of mixed fatty acids having saturated and unsaturated fatty acid components, and triglycerides having saturated and unsaturated fatty acid components, which method comprises the steps of treating the said fatty material with a chromic acid oxidizing agent to disruptively oxidize the said unsaturated acid components to produce saturated components of lower molecular weight by scission at the double bonds of the unsaturated components, and then separating the products of oxidation from the unchanged material.

J. D. FITZPATRICK.
LATIMER D. MYERS.